United States Patent
Sheffield

(10) Patent No.: US 10,374,813 B2
(45) Date of Patent: Aug. 6, 2019

(54) COUPLER FOR POWER LINE COMMUNICATION AND POWER-OVER-ETHERNET

(71) Applicant: THE BOEING COMPANY, Huntington Beach, CA (US)

(72) Inventor: Gregory Lloyd Sheffield, O'Fallon, MO (US)

(73) Assignee: THE BOEING COMPANY, Chicago, IL (US)

( * ) Notice: Subject to any disclaimer, the term of this patent is extended or adjusted under 35 U.S.C. 154(b) by 738 days.

(21) Appl. No.: 14/821,199

(22) Filed: Aug. 7, 2015

(65) Prior Publication Data
US 2017/0041152 A1 Feb. 9, 2017

(51) Int. Cl.
*H05K 1/02* (2006.01)
*H04L 12/10* (2006.01)
*H04B 3/54* (2006.01)
*H04B 3/56* (2006.01)
*H02J 3/02* (2006.01)
*H04L 12/24* (2006.01)

(52) U.S. Cl.
CPC .......... *H04L 12/10* (2013.01); *H02J 3/02* (2013.01); *H04B 3/542* (2013.01); *H04B 3/56* (2013.01); *H04L 41/0659* (2013.01); *H04B 2203/547* (2013.01); *H04B 2203/5483* (2013.01)

(58) Field of Classification Search
CPC ........ H04L 12/10; H04L 41/0659; H02J 3/02; H04B 3/56; H04B 3/542; H04B 2203/547; H04B 2203/5483

USPC .......................................................... 307/42
See application file for complete search history.

(56) References Cited

U.S. PATENT DOCUMENTS

| 6,191,500 B1 * | 2/2001 | Toy ..................... H02J 3/46 307/64 |
| 6,909,943 B2 | 6/2005 | Lehr et al. |
| 6,987,430 B2 | 1/2006 | Wasaki et al. |
| 7,046,796 B2 | 5/2006 | Rabenko et al. |
| 7,408,753 B2 * | 8/2008 | Chueh .................. H02H 9/005 361/119 |

(Continued)

FOREIGN PATENT DOCUMENTS

| WO | 0206684 A2 | 8/2002 |
| WO | 2002065684 A3 | 8/2002 |

OTHER PUBLICATIONS

EP Extended Search Report for related application 16169042.5 dated Dec. 19, 2016, 8 pp.

(Continued)

*Primary Examiner* — Richard Tan
(74) *Attorney, Agent, or Firm* — Armstrong Teasdale LLP

(57) ABSTRACT

A coupler is provided. The coupler includes a power line, a PLC-to-Ethernet converter, a first transformer, and a power sourcing circuit. The power line is coupled between a first connector and a second connector. The power line is configured to conduct PLC signals. The PLC-to-Ethernet converter is configured to convert between the PLC signals and Ethernet signals. The first transformer is coupled between the PLC-to-Ethernet converter and a third connector. The first transformer is configured to condition the Ethernet signals for power-over-Ethernet transmission. The power sourcing circuit is coupled to the power line and configured to provide power to the first transformer.

20 Claims, 4 Drawing Sheets

(56) References Cited

U.S. PATENT DOCUMENTS

| | | | |
|---|---|---|---|
| 8,325,759 B2 | 12/2012 | Hazani et al. | |
| 9,100,105 B2 | 8/2015 | Yamamoto et al. | |
| 2005/0125083 A1* | 6/2005 | Kiko | G05B 15/02 |
| | | | 700/19 |
| 2005/0281326 A1 | 12/2005 | Yu | |
| 2008/0116745 A1 | 5/2008 | Chang et al. | |
| 2008/0123302 A1* | 5/2008 | Kawano | H04B 3/54 |
| | | | 361/728 |
| 2008/0130640 A1* | 6/2008 | Hurwitz | H04B 3/54 |
| | | | 370/389 |
| 2009/0096592 A1* | 4/2009 | Wu | H04B 3/542 |
| | | | 307/66 |
| 2009/0195970 A1* | 8/2009 | Lee | H01R 13/652 |
| | | | 361/601 |
| 2009/0265563 A1* | 10/2009 | Camagna | G06F 1/266 |
| | | | 713/300 |
| 2010/0049994 A1 | 2/2010 | Ghoshal | |
| 2014/0062206 A1* | 3/2014 | Bryson | H02J 3/385 |
| | | | 307/80 |
| 2014/0240902 A1* | 8/2014 | Burch | H02B 7/06 |
| | | | 361/626 |

OTHER PUBLICATIONS

Communication Pursuant to Article 94(3) EPC for Application No. 16169042.5, dated Feb. 14, 2018, 6 pages.
EP Examination Report for related application 16169042.5 dated Oct. 4, 2018; 6 pp.

* cited by examiner

COUPLER FOR POWER LINE COMMUNICATION AND POWER-OVER-ETHERNET

BACKGROUND

The field of the disclosure relates generally to power distribution and communication buses and, more specifically, to a power line communication to power-over-Ethernet coupler.

Many electrical systems utilize both a power distribution system and a communication system. These systems are often independently operated over distinct conductors, which generally requires installation of both power distribution wiring and communication wiring. In many applications the installation of separate power distribution and communication wiring is practical. However, in certain applications, such as aircraft, for example, additional wiring is installed at the expense of weight, installation cost, and maintenance cost.

BRIEF DESCRIPTION

According to one aspect of the present disclosure, a coupler is provided. The coupler includes a power line, a PLC-to-Ethernet converter, a first transformer, and a power sourcing circuit. The power line is coupled between a first connector and a second connector. The power line is configured to conduct power line communication (PLC) signals. The PLC-to-Ethernet converter is configured to convert between the PLC signals and Ethernet signals. The first transformer is coupled between the PLC-to-Ethernet converter and a third connector. The first transformer is configured to condition the Ethernet signals for power-over-Ethernet (POE) transmission. The power sourcing circuit is coupled to the power line and configured to provide power to the first transformer.

According to another aspect of the present disclosure, a system for power distribution and communication is provided. The system includes a power line and a first coupler. The power line is couplable to a power source and is configured to conduct PLC signals. The first coupler is coupled to the power line and is configured to form a first POE branch couplable to a POE device. The first coupler is further configured to provide current-limited power to the POE device through the first POE branch. The first coupler is further configured to convert the PLC signals to POE signals for transmission to the POE device through the first POE branch. The coupler is further configured to convert received POE signals, from the POE device, to the PLC signals for transmission over the power line.

According to yet another aspect of the present disclosure, a method of communicating over a PLC bus is provided. The method includes converting a received POE signal, from a coupler, to a local power signal and a local communication signal. The method further includes transmitting a POE signal to the coupler through a POE branch. The method further includes converting, at the coupler, the POE signal to a PLC signal for transmission on the PLC bus. The method further includes limiting, at the coupler, a current conducted by the POE branch.

The features, functions, and advantages that have been discussed can be achieved independently in various embodiments or may be combined in yet other embodiments further details of which can be seen with reference to the following description and drawings.

DETAILED DESCRIPTION

Figure 1:
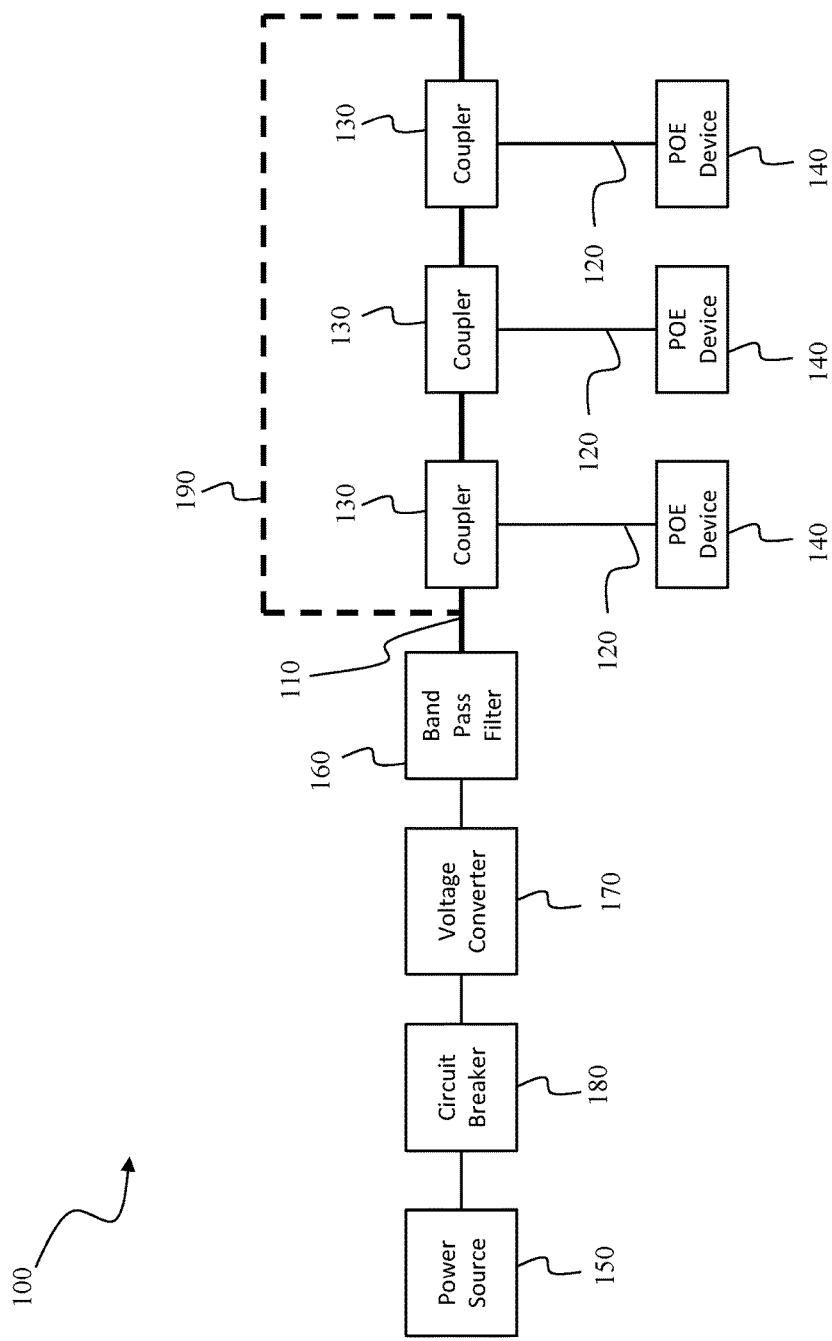
FIG. 1 is block diagram of one embodiment of a system for power distribution and communication.

As used herein, an element or step recited in the singular and proceeded with the word "a" or "an" should be understood as not excluding plural elements or steps unless such exclusion is explicitly recited. Furthermore, references to "one embodiment" of the present invention or the "exemplary embodiment" are not intended to be interpreted as excluding the existence of additional embodiments that also incorporate the recited features.

Power-over-Ethernet (POE) is a technology used to deliver electrical power and data over Ethernet cabling. Power may be carried on dedicated power conductors, or together with data. For example, in 10Base-T, two twisted-pairs are used for data, leaving the others for power transmission. When power and data share conductors, power can be transmitted by a common-mode voltage applied to each twisted-pair. A POE device extracts the power using a center tap of an Ethernet pulse transformer. POE techniques are partially standardized in IEEE 802.3, where a POE device is referred to as a powered device (PD) and power sourcing circuitry is referred to as power source equipment (PSE). POE facilitates communication between PSE and a PD to control power delivery.

Power line communication (PLC) is a technology used to carry data over power lines. Generally, PLC systems add a modulated carrier signal to the ordinary power signal that is transmitted over the power lines. The particular carrier frequency and modulation scheme depends on the frequency of the power conducted over the power lines. For example, for alternating current (AC) power distribution systems operating at 50 or 60 Hertz (Hz), carrier frequencies are chosen that avoid the 50 or 60 Hz band, while providing sufficient range, bandwidth, and data rates for the application. Generally, higher bandwidth is achieved at the expense of range. Many power lines are ill-suited for high-frequency communication given the distances they span. Moreover, many areas of the world, such as the European Union and the United States, for example, regulate transmissions in certain frequency bands. Although alternative schemes are possible, amplitude modulation is common in PLC systems.

It is realized herein that many power distribution and communication applications would benefit from a system that combines PLC and POE technologies. It is further realized herein that a PLC bus can serve multiple POE devices having various power and communication demands. Multiple POE nodes can be coupled to the PLC bus through respective coupler devices, each coupler providing pass-through for power and PLC signals, and also forming a POE branch to which a POE device can couple. It is further realized herein that each coupler can provide over-current protection to a connected POE device. Additionally, such protection serves to isolate a faulty POE branch from down-stream POE branches and POE devices.

Thus, exemplary embodiments may provide a coupler that interfaces between a PLC bus and a POE device. More specifically, an embodiment coupler provides pass-through transmission of power and PLC signals through first and second connectors. Coupler embodiments further provide current-limited power to a POE branch via a third connector. Coupler embodiments further provide conversion between PLC and Ethernet protocols. Exemplary technical effect of the methods, systems, and apparatus described herein include at least one of: (a) sharing of conductors between power distribution and communication functions; (b) reduced wiring weight, installation cost, and maintenance cost by eliminating dedicated conductors; (c) ability to couple multiple power sources to a PLC bus while providing multiple POE nodes; (d) over-current protection of POE devices; (e) programmable current limits in over-current protection; and (f) fault isolation with respect to various POE devices coupled to POE nodes formed by the PLC bus and couplers.

FIG. 1 is block diagram of one embodiment of a system 100 for power distribution and communication. System 100 includes a power line 110. Power line 110 includes one or more conductors configured to conduct PLC signals as well as power. Power line 110 is also referred to as a PLC bus. System 100 also includes multiple POE branches 120 that are respectively coupled to power line 110 by couplers 130. POE branches 120 include standard Ethernet cabling for transmission of both data and power to multiple POE devices 140. POE devices 140, also referred to as powered devices, include any electronic device configured to receive a POE signal and extract the power signal to power itself or another electronic component.

Each of couplers 130 are configured to form the respective POE branches 120 by converting between PLC signals and POE signals, and by providing current-limited power to a POE transformer from power line 110. Couplers 130 each provide over-current protection to their respective POE devices 140. When an over-current occurs at a POE device 140, the corresponding coupler 130 isolates that POE device 140 and POE branch 120 from the remaining POE devices 140. Couplers 130 prevent faults and noise originating on the POE branches 120 from feeding back into power line 110 and other POE branches 120 and POE devices 140.

System 100 also includes a power source 150. Power source 150 can be any suitable power source for system 100 based on the power demands and communication demands. For example, each of POE devices 140 may have a different power demand and, further, may have varying communication demands with respect to data rates, bandwidth, and range. The respective couplers 130 for POE devices 140 may, in certain embodiments, be programmed to limit the power that can be delivered to a particular POE device. For example, if one of POE devices 140 is a remote sensor rated for no more than 200 milliamps, then the corresponding coupler of couplers 130 could be programmed to limit current on its POE branch 120 to 200 milliamps.

Power line 110 couples to power source 150 through a band pass filter 160, a voltage converter 170, and a circuit breaker 180. Circuit breaker 180 is generally rated for the current capacity of power line 110 to protect power line 110 itself. Each of couplers 130 would similarly be rated for that current capacity with respect to pass-through current. In alternative embodiments, power line 110 is coupled to multiple power sources, each being similarly isolatable by a circuit breaker, such as circuit breaker 180. Power line 110, in such an embodiment, could be arranged in a ring bus architecture 190.

Voltage converter 170 is configured to convert power delivered by power source 150 to a suitable level for power line 110 and its associated PLC bus specifications. Voltage converter 170 may include one or more voltage conversion stages to condition the power for use on power line 110. Band pass filter 160 is configured to block communication signals from radiating beyond power line 110. More specifically, band pass filter 160 prevents PLC signals from radiating into voltage converter 170, circuit breaker 180, and power source 150.

Figure 2:
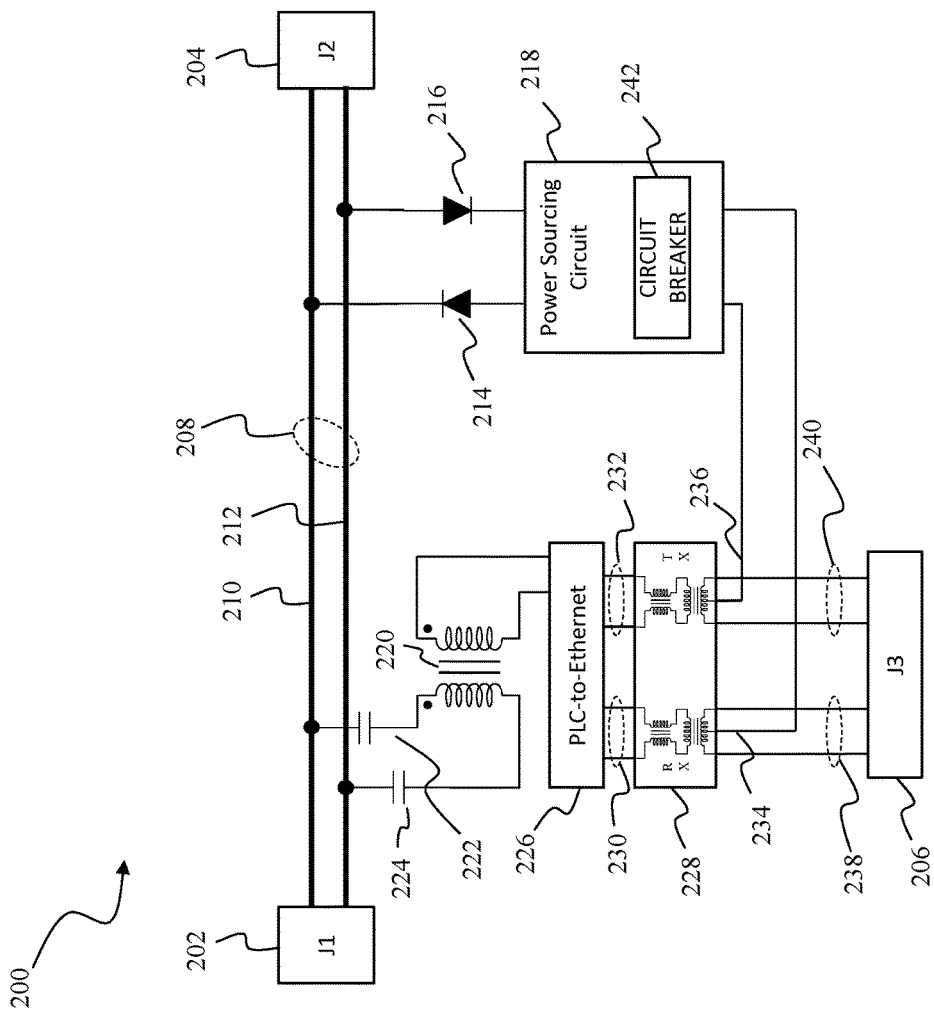
FIG. 2 is a schematic diagram of one embodiment of a coupler.

FIG. 2 is a schematic diagram of one embodiment of a coupler 200. Coupler 200 includes a connector 202, a connector 204, and a connector 206, also referred to as connectors J1, J2, and J3, respectively. Connector 202 and connector 204 are coupled to a PLC bus 208 that includes a first conductor 210 and a second conductor 212. PLC bus 208 is configured to conduct both power and PLC signals between connector 202 and connector 204, which facilitates a pass-through of power and communication. In certain embodiments, for example, PLC bus 208 conducts direct current (DC) power. In certain embodiments, for example, PLC bus 208 conducts amplitude modulated PLC signals. Connector 206 is a POE interface for a POE device, such as, for example, POE devices 140 (shown in FIG. 1).

In certain embodiments, connector 202 and connector 204 are Twinax connectors having two co-axial conductors and shielding. Further, the Twinax connectors are impedance matched for PLC communication, which is suitable for installation in aircraft. In alternative embodiments, connector 202 and connector 204 are any suitable connector for PLC bus 208. In certain embodiments, connector 206 is a Quadrax connector having four conductors and shielding. Further, the Quadrax connector is impedance matched for Ethernet transmissions. In alternative embodiments, connector 206 can be any suitable connector for POE transmissions.

Coupler 200 further includes a first diode 214 and a second diode 216 respectively coupled to first conductor 210 and second conductor 212. First diode 214 and second diode 216 are coupled between PLC bus 208 and a power sourcing circuit 218, and operate as a rectifier. Power sourcing circuit 218, also referred to as power sourcing equipment, in certain embodiments, includes a circuit breaker 242 for limiting current through connector 206 to the POE branch and the POE device. In certain embodiments, the circuit breaker 242 has a programmable current limit that can be customized to a particular POE device power demand. The current limit can be programmed, for example, and without limitation, in the field and during manufacturing.

Coupler 200 also includes a transformer 220 having a first winding capacitively coupled to PLC bus 208 by a first capacitor 222 and a second capacitor 224. A second winding of transformer 220 is coupled to a PLC-to-Ethernet converter 226. PLC-to-Ethernet converter 226 converts between PLC signals and Ethernet signals. The capacitive coupling of transformer 220 to PLC bus 208 helps prevent faults and noise originating on the POE branch from feeding back onto PLC bus 208. For communication originating on PLC bus 208, transformer 220 conditions PLC signals for conversion to Ethernet signals. For communication originating on the POE branch, transformer 220 conditions PLC signals, which are converted from Ethernet signals, for transmission on PLC bus 208.

PLC-to-Ethernet converter 226 is coupled to an Ethernet transformer 228. In certain embodiments, Ethernet transformer 228 is an Ethernet pulse transformer. Ethernet transformer 228 includes a receive (RX) stage and a transmit (TX) stage, each coupled to PLC-to-Ethernet converter 226 via differential pairs 230 and 232. Ethernet transformer 228 is configured to condition received Ethernet signals for conversion to PLC signals. Ethernet transformer 228 is further configured to condition signals for transmission over the POE branch. The RX and TX stages of Ethernet transformer 228 each include a center tap coupled to power sourcing circuit 218. The RX stage is configured to extract a power signal on center tap 234 from a received POE signal on a RX differential pair 238. Ethernet transformer 228 conditions the received differential Ethernet signal to voltage levels suitable for PLC-to-Ethernet converter 226. Likewise, the TX stage is configured to inject a power signal on center tap 236 into a transmit POE signal on a TX differential pair 240. Ethernet transformer 228 conditions the transmit Ethernet signal for transmission through connector 206 onto the POE branch by applying a common mode voltage to TX differential pair 240.

Figure 3:
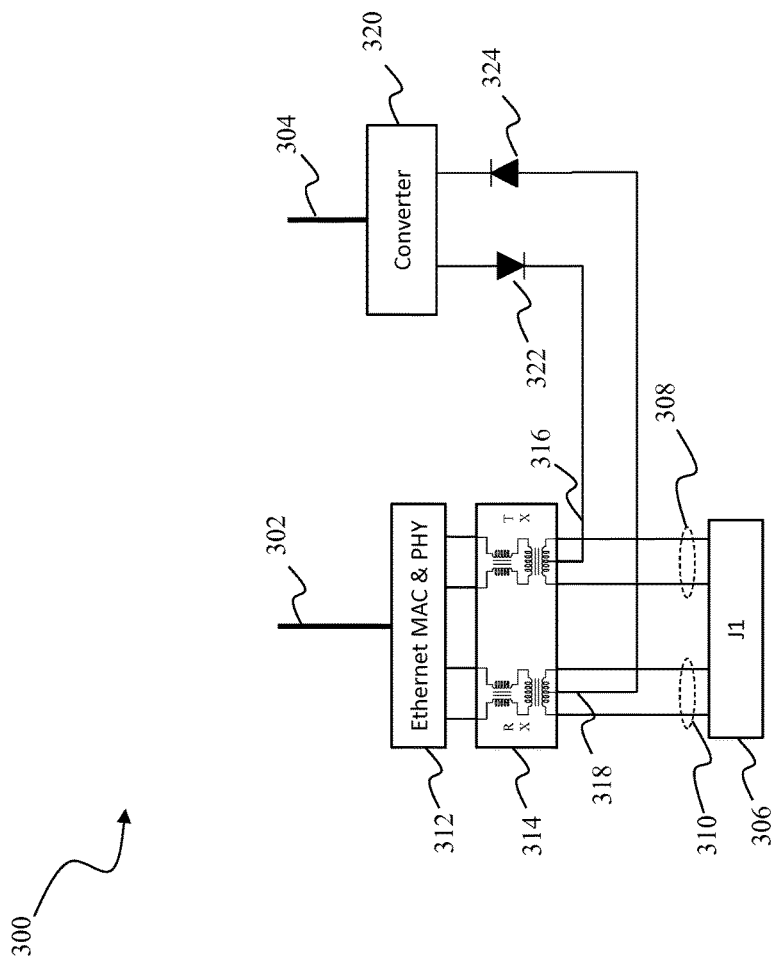
FIG. 3 is a schematic diagram of one embodiment of a power-over-Ethernet device.

FIG. 3 is a schematic diagram of one embodiment of a POE device 300. POE device 300 includes a local communication bus 302 and a local power bus 304. In certain embodiments, local communication bus 302 includes a peripheral component interconnect (PCI) bus, or any other suitable communication bus for POE device 300. POE device 300 also includes a connector 306 for transmitting and receiving POE signals. Connector 306 is also referred to as connector J1. Connector 306 includes a transmit differential pair 308 and a receive differential pair 310.

A transmit message originates on local communication bus 302, which is coupled to an Ethernet machine access controller (MAC) and physical (PHY) module 312. Ethernet MAC & PHY module 312 is configured to convert the transmit message to a differential signal for Ethernet transmission. The differential signal is passed to an Ethernet transformer 314; where it is conditioned for Ethernet transmission over transmit differential pair 308.

A received message originates on a PLC bus, such as PLC bus 208 (shown in FIG. 2), and converted to a POE signal that arrives at connector 306 on receive differential pair 310. Ethernet transformer 314 conditions the POE signal for conversion by Ethernet MAC & PHY module 312 to local communication bus 302.

Ethernet transformer 314, like Ethernet transformer 228 (shown in FIG. 2), includes an RX stage and a TX stage, each having a center tap. The TX stage includes a center tap 316 through which a common mode voltage is applied to the outgoing Ethernet signal on transmit differential pair 308. The RX stage includes a center tap 318 through which the common mode voltage is extracted from the incoming Ethernet signal on receive differential pair 310. Center tap 316 and center tap 318 are coupled to a voltage converter 320, which converts between POE power and local power bus 304. Center tap 316 couples to converter 320 through a diode 322, operating as a rectifier for power sourced from local power bus 304 for POE transmissions over transmit differential pair 308. Center tap 318 couples to converter 320 through a diode 324, operating as a rectifier for power extracted from a received POE signal on receive differential pair 310.

Figure 4:
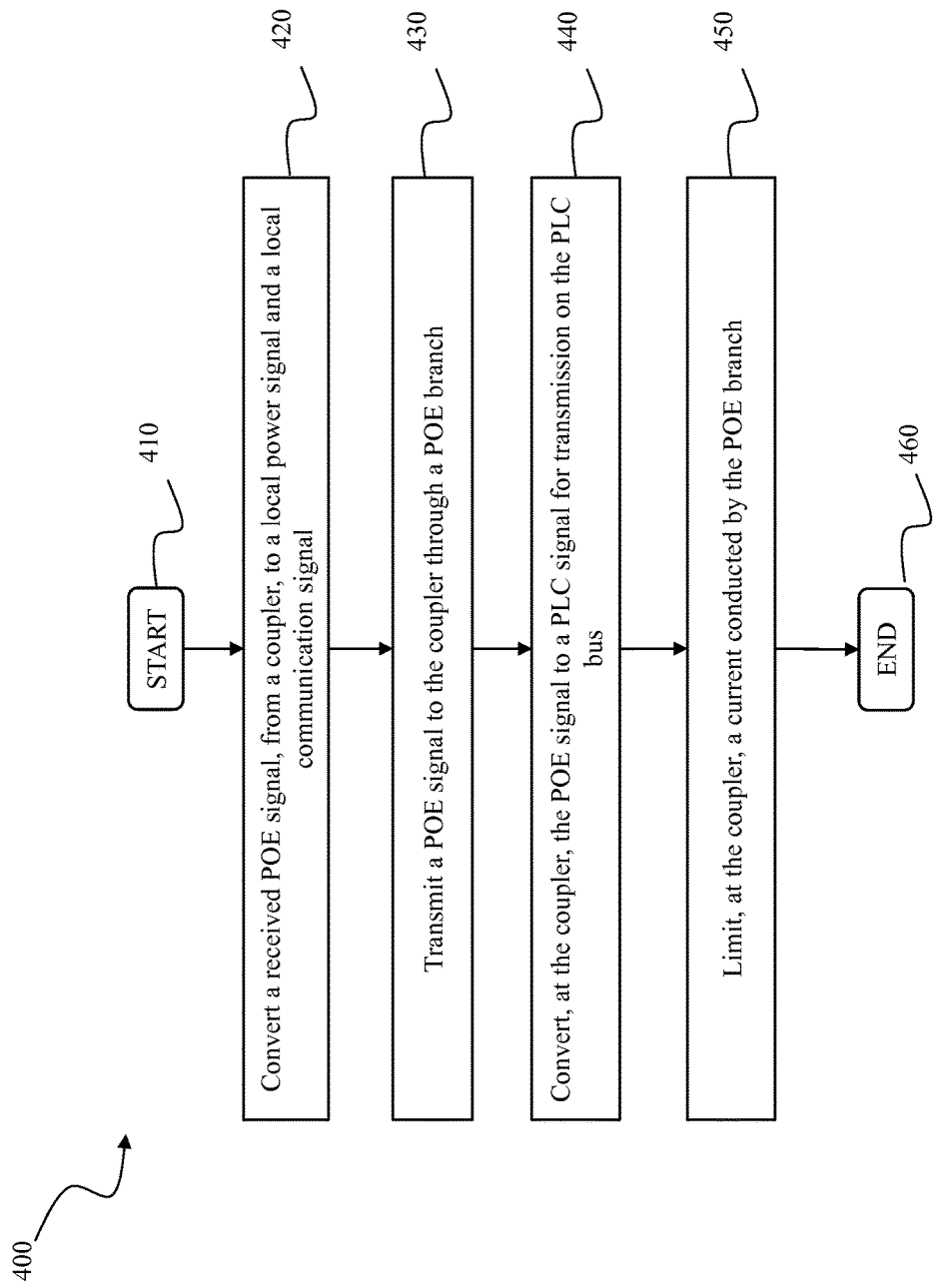
FIG. 4 is a flow diagram of one embodiment of a method of communicating over a power line communication bus.

FIG. 4 is a flow diagram of one embodiment of a method 400 of communicating over a PLC bus. The method begins at a start step 410. At a receive step 420, a received POE signal is converted to a local power signal and a local communication signal. In certain embodiments, converting the received POE signal to the local power signal includes rectifying a power signal extracted from the differential Ethernet signal. Converting the received POE signal to the local power signal also includes, in certain embodiments, one or more voltage conversions to condition the power signal for a local power bus. In certain embodiments, converting the received POE signal to a local communication signal includes conditioning the voltage levels differential Ethernet signals for conversion in an Ethernet MAC layer and PHY layer. The POE signal is received from a coupler at a POE device. The coupler is capacitively coupled to a PLC bus and forms a POE branch off of the PLC bus.

At a transmit step 430, a POE signal is transmitted by the POE device to the coupler over the POE branch. At the coupler, the POE signal is converted to a PLC signal at a conversion step 440. The PLC signal is then ready for transmission over the PLC bus.

At a protection step 450, the coupler limits current conducted by the POE branch. The current limit, in certain embodiments, is programmable for the POE device. In certain embodiments, the coupler includes a circuit breaker for limiting current and for providing isolation during a fault condition. In such an embodiment, the circuit breaker isolates the POE branch and POE device from the PLC bus and other downstream POE branches. The method then ends at an end step 460.

This written description uses examples to disclose various embodiments, which include the best mode, to enable any person skilled in the art to practice those embodiments, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A coupler, comprising:
    a first Twinax connector and a second Twinax connector configured to be respectively coupled to a power line communication (PLC) bus;
    a power line coupled between the first Twinax connector and the second Twinax connector, the power line configured to conduct PLC signals;
    a PLC-to-Ethernet converter coupled to the power line and configured to convert between the PLC signals and Ethernet signals;
    a first transformer coupled between the PLC-to-Ethernet converter and a third connector, the first transformer configured to condition the Ethernet signals for power-over-Ethernet (POE) transmission as first POE signals; and
    a power sourcing circuit coupled to the power line and configured to provide power to the first transformer.

2. The coupler recited in claim 1 further comprising a second transformer coupled between the power line and the PLC-to-Ethernet converter.

3. The coupler recited in claim 2, wherein the second transformer is capacitively coupled to the power line.

4. The coupler recited in claim 1, wherein the power sourcing circuit comprises a circuit breaker configured to limit current to the third connector.

5. The coupler recited in claim 4, wherein the circuit breaker comprises a programmable current limit.

6. The coupler recited in claim 1 further comprising a rectifier coupled in series with the power sourcing circuit.

7. The coupler recited in claim 1, wherein the first transformer comprises a transmit stage having a center-tap coupled to the power sourcing circuit and configured to receive power there from.

8. A system for power distribution and communication, comprising:
  a first power line couplable to a power source and configured to conduct power line communication (PLC) signals;
  a second power line configured to conduct the PLC signals; and
  a first coupler coupled to the first power line by a first Twinax connector and to the second power line by a second Twinax connector, the first coupler configured to:
    form a first power-over-Ethernet (POE) branch configured to be coupled to a POE device,
    provide current-limited power to the POE device through the first POE branch,
    convert the PLC signals to POE signals for transmission to the POE device over the first POE branch,
    convert received POE signals, from the POE branch, to the PLC signals for transmission over the power line, and
    pass through power and the PLC signals from the first power line through the first Twinax connector to the second power line through the second Twinax connector, and from the second power line to the first power line.

9. The system recited in claim 8 further comprising a second coupler coupled to the power line and configured to form a second POE branch.

10. The system recited in claim 8, wherein the power line comprises a two-conductor bus.

11. The system recited in claim 8, wherein the power line is further couplable to a second power source.

12. The system recited in claim 8, wherein the power line is further couplable to the power source through a band pass filter, a voltage converter, and a circuit breaker.

13. The system recited in claim 8, wherein the first coupler is configured to capacitively couple the first POE branch to the power line.

14. The system recited in claim 8, wherein the first power line and the second power line form at least a portion of a ring bus for conducting the PLC signals.

15. The system recited in claim 8, wherein the first coupler further comprises a circuit breaker coupled between the first power line and the first POE branch, the circuit breaker configured to limit current passing through the first POE branch.

16. A method of communicating over a power line communication (PLC) bus, comprising:
  converting a received power-over-Ethernet (POE) signal, from a coupler, to a local power signal and a local communication signal, the converting comprising rectifying the local power signal and conditioning a voltage of the local power signal;
  transmitting a POE signal to the coupler through a Quadrax connector for a POE branch;
  converting, at the coupler, the POE signal to a PLC signal for transmission on the PLC bus through a Twinax connector; and
  limiting, at the coupler, a current conducted by the POE branch.

17. The method recited in claim 16, wherein converting the received POE signal comprises conditioning voltages of the received POE signal for a media access control (MAC) layer and a physical layer.

18. The method recited in claim 16 further comprising capacitively coupling, at the coupler, the POE branch to the PLC bus.

19. The method recited in claim 16 further comprising configuring the coupler to a predetermined current limit for the POE branch.

20. The method recited in claim 16 further comprising:
  detecting a fault on the POE branch; and
  isolating the POE branch from the PLC bus.

* * * * *